United States Patent [19]

Brakhage, Jr. et al.

[11] Patent Number: 4,475,598

[45] Date of Patent: Oct. 9, 1984

[54] BALL VALVE ACTUATING MECHANISM

[75] Inventors: William L. Brakhage, Jr., Broken Arrow; Timothy R. Cupples, Tulsa, both of Okla.

[73] Assignee: Baker Oil Tools, Inc., Orange, Calif.

[21] Appl. No.: 395,514

[22] Filed: Jul. 6, 1982

[51] Int. Cl.³ ............................................. E21B 34/10
[52] U.S. Cl. ..................................... 166/321; 251/172
[58] Field of Search ................................. 166/321–324, 166/373–375, 319–320; 251/63.4, 61, 159, 172

[56] References Cited

U.S. PATENT DOCUMENTS

| Re. 25,471 | 11/1963 | Fredd | 166/321 X |
| 3,310,114 | 3/1967 | Dollison | 166/321 X |
| 4,293,038 | 10/1981 | Evans | 251/172 X |

Primary Examiner—Ernest R. Purser
Assistant Examiner—Thuy M. Bui

Attorney, Agent, or Firm—Norvell & Associates

[57] ABSTRACT

The disclosure provides an actuating mechanism for a rotatable ball valve unit wherein several axially extending pistons and cylinder units or bellows elements are mounted in the wall of the outer housing of the ball valve in angularly spaced relationship. Two diametrically opposed piston or bellows elements actuate the mechanism for axially shifting and then rotating the ball valve, while the remaining piston or bellows elements effect a displacement of the flow tube to maintain a seal carried by the flow tube in sealing engagement with the ball after its rotational movement has been accomplished. The desired delay of movement of the flow tube is accomplished through either varying the size of the bellows element or the spring constants of the springs opposing the actuating movement of the pistons, bellows elements or a combination of these.

18 Claims, 5 Drawing Figures

BALL VALVE ACTUATING MECHANISM

BACKGROUND OF THE INVENTION

1. Field of the Invention

This invention relates to an improved actuating mechanism for ball valves, particularly the type that are employed in subterranean wells.

2. Description of the Prior Art

A ball valve which is rotatable between an open and closed position with respect to a fluid conduit is employed in many industrial applications, but finds particular utility when employed as a safety valve in a subterranean well. The typical ball valve has a cylindrical flow passage through its center and is rotatable between an open position, wherein the flow passage is aligned with the fluid conduit in which the ball valve is mounted, and a closed position wherein the fluid passage is disposed transversely with respect to the bore of the fluid conduit. To prevent leakage around the exterior of the ball in its closed position, it is common to provide a so-called flow tube which carries in its end an annular seal for sealingly engaging the periphery of the ball in its closed position. Appropriate seals are provided for effecting the sealed engagement of the flow tube in the tubular conduit, hence fluid leakage around the exterior of the ball in the closed position is effectively prevented.

It has long been recognized that it is desirable to remove the annular seal carried by the flow tube from pressured engagement with the ball surface prior to effecting rotational movement of the ball. See for example, U.S. Pat. No. 4,293,038 to Evans, wherein a single angular piston is employed to axially shift an actuating sleeve which first engages the ball sealing elements of the flow tube to move them out of engagement with the ball surface and then a cam slot in the actuating sleeve engages the ball rotation pins to effect the rotation of the ball to its open position.

The use of a conventional annular flow tube mechanism does have certain disadvantages, however. In the first place, through the employment of an annular piston, which necessarily must be of greater internal diameter than the bore of the flow conduit, relatively expensive and short-lived sealing elements must be employed to effect the necessary seals around the piston to insure its actuation by an applied control fluid pressure. Additionally, the utilization of a common piston to first shift the flow tube away from the ball and then to rotate the ball has the disadvantage that any jamming of the flow tube will prevent the ball from being rotated.

SUMMARY OF THE INVENTION

This invention provides an actuating mechanism for a ball type valve of the type that is rotatable in a conduit between an open and a closed position. Conventional rotating pins are provided on the ball to effect its rotation, and a conventional flow tube is mounted within the conduit to sealingly cooperate with the ball surface to prevent fluid flow around the ball in its closed position. Separate actuators are provided for respectively axially shifting the ball rotation actuator and the flow tube. These actuators can comprise small diameter piston and cylinder units or bellows units mounted in the wall of the housing containing the entire ball valve mechanism. Preferably several small diameter piston and cylinder or bellows elements diametrically disposed relative to each other are provided which operate axially shiftable ball rotating actuators. Other small diameter piston and cylinder or bellows elements diametrically disposed relative to each other, and located at an angular position with respect to the first mentioned small diameter bellows units, are each connected to opposite sides of the flow tube to effect the shifting of the flow tube into sealing engagement with the ball perimeter.

While control fluid pressure is concurrently supplied to all of the small diameter actuating cylinders or bellows units, the response of the flow tube actuators to the application of such control fluid pressure is delayed through the employment of stiffer spring elements and/or smaller diameter piston or bellows elements so that the ball rotation actuator is shifted to move the ball axially away from the flow tube prior to the ball being actuated to rotate to an open position. It is thereby assured that the ball will not be rotated while the flow tube seals are compressively engaged with its perimeter.

A further feature of the invention is the incorporation of bellows units to effect the fluid seals required to isolate the control fluid pressure supplied to the actuating bellows units from the well fluids without the incorporation of any elastomeric sealing elements. This latter feature is described and claimed in co-pending application Ser. No. 395,544 filed concurrently herewith and assigned to the assignee of the instant application.

Further advantages of the ball valve actuating mechanism embodying this invention will be readily apparent to those skilled in the art from the following description, taken in conjunction with the annexed sheets of drawings on which is shown, by way of example only, a preferred embodiment of the invention.

DESCRIPTION OF THE PREFERRED EMBODIMENT

Figure 1A:
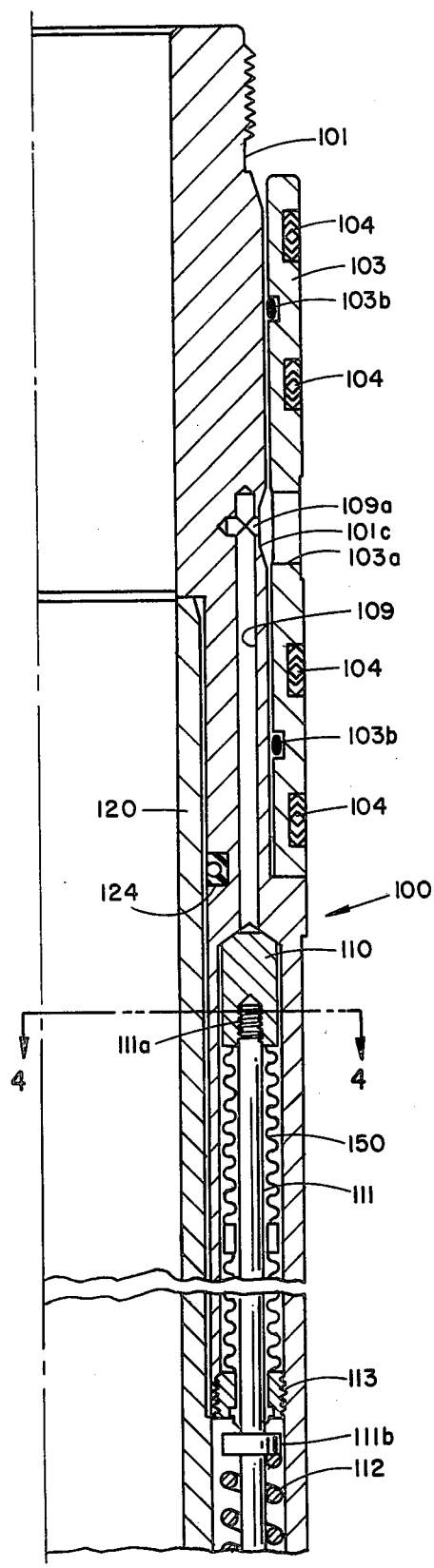
FIGS. 1A and 1B collectively constitute a vertical quartersectional view of a ball valve unit incorporating an actuating mechanism embodying this invention, with the ball valve being shown in its closed position.
Figure 1B:
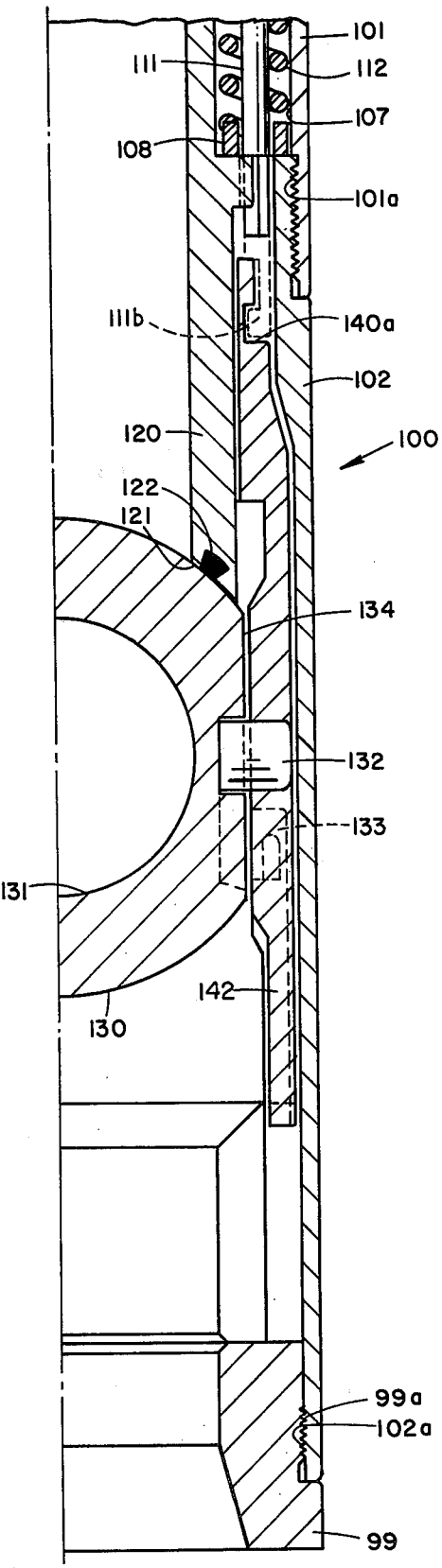

Referring now to FIGS. 1A and 1B, the numeral 100 represents a ball valve assemblage which may be positioned within a well conduit in conventional fashion. The ball valve assemblage includes a tubular upper housing 101 which is threadably secured as by threads 101a to a tubular lower housing 102. Surrounding the upper housing 101 is a sealing tube 103 upon which are mounted a plurality of axially spaced chevron type seals 104 for sealingly engaging the bore of the well conduit (not shown) within which the valve unit 100 is positioned.

A valve closure member, in the preferred embodiment comprising a rotatable ball valve 130 of conventional configuration is provided having a central axial bore 131 which may be positioned either in alignment with the bore of the lower housing 102 or disposed transversely to the bore of housing 102 as shown in FIG. 1B. Ball valve 130 is provided with flattened surfaces 134 on its opposite sides and a pair of ball pivot pins 132 project from the flattened surfaces 134 to provide a pivot axis for rotation of the ball. Additionally, flattened surfaces 134 are provided with recessed camming surfaces 135 (FIG. 3) which are respectively engaged by ball rotation pins 133. Ball rotation pins 133 are respectively mounted on the upper ends of two upstanding axial flanges 99b which project upwardly from a bottom sub 99, which is threadably secured by threads 99a engaging threads 102a provided in the bottom of the lower housing 102 (FIG. 1B and FIG. 3).

Figure 3:
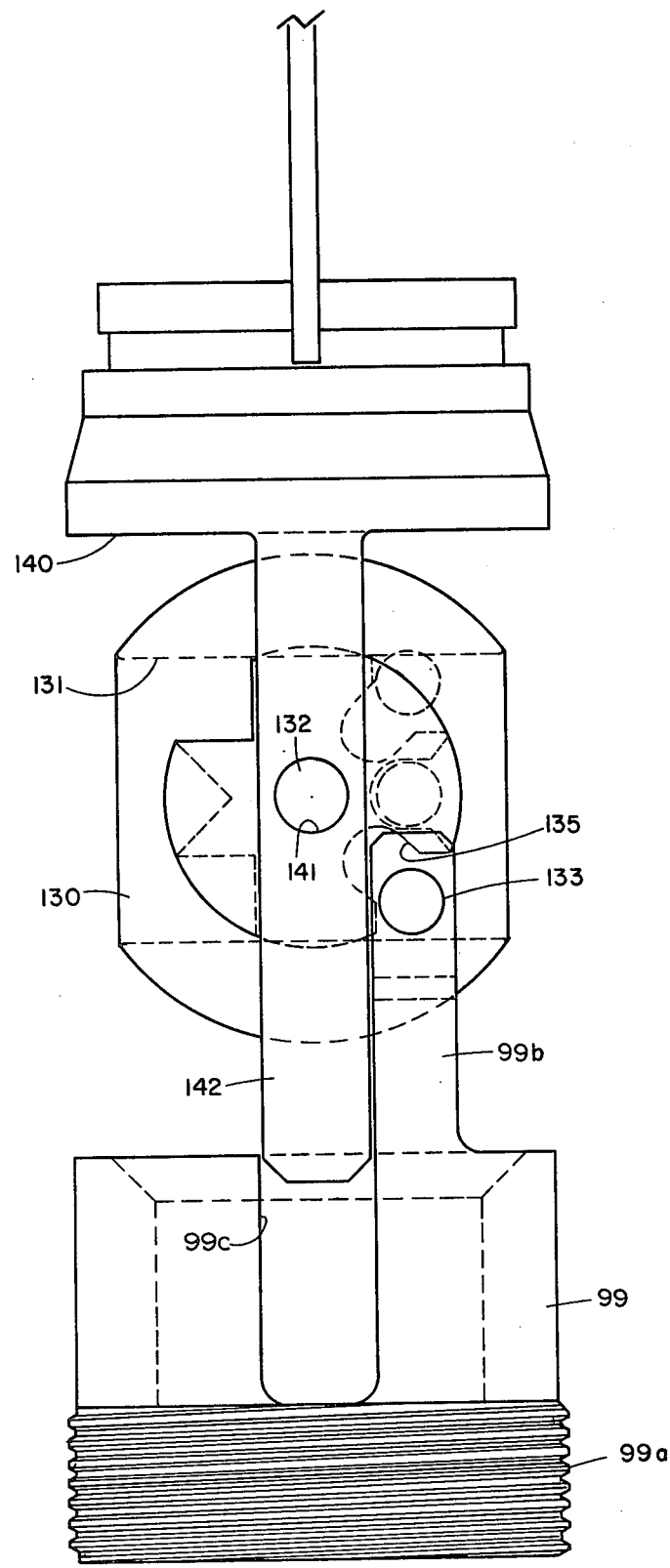
FIG. 3 is an elevational view, with parts removed for clarity, of the ball valve actuating mechanism incorporated in the ball valve unit of FIGS. 1A and 1B.

The ball 130 is supported by the pivot pins 132 respectively engaging apertures 141 provided in two depending flanges 142 formed on an annular ball actuating sleeve 140 (FIG. 3). Axial slots 99c are provided in the bottom sub 99 to permit downward movement of the depending axial flanges 142. From FIG. 3 it will be readily apparent that upon the occurrence of relative downward movement of the actuator sleeve 140 with respect to the bottom sub 99, the entire ball valve 130 is first moved axially downwardly, and then the ball 130 is rotated about pivot pins 132 through the interengagement of the rotation pins 133 with the upstanding cam surfaces 135 provided on ball valve 130.

As is well known to those skilled in the art, it is desirable to provide some form of sealing mechanism to prevent fluid leakage around the exterior of the ball valve 130 when it is positioned in its closed position with respect to the bore of housing 102. Such seal is provided by a flow tube 120 which is mounted for axial sliding movement within the bores of the lower housing 102 and upper housing 101. Flow tube 120 is provided with a chamfered end surface 121 and an annular resilient seal 122 is mounted in such end surface and is normally positioned in sealing engagement with the perimeter of the ball 130. Additionally, as best shown in FIG. 1A, an annular seal 124 is provided in the interior bore surface of upper housing 101 to maintain a sealing engagement with the external periphery of flow tube 120. Thus, fluid leakage around the flow tube and around the perimeter of the ball 130 is effectively eliminated.

It is equally desirable that the annular seal 122 carried by the end of the flow tube 120 be maintained in engagement with the perimeter of the ball 130 when the ball is in its open position so as to prevent any substantial amount of fluid flow around the exterior of the ball which always involves the risk that particulate matter carried by the fluid can obstruct the operation of the pivot pin 132 and camming pin 133 and to minimize turbulance. Therefore, the following sequence of movement of the ball valve 130 and its actuating sleeve 140 relative to the flow tube 120 represents the desired operating condition. The ball valve 130 should be moved axially out of engagement with the annular seal 122 carried by flow tube 120 before any rotation of the ball valve 130 occurs, thus, eliminating the possibility of damage to the annular seal 122. However, when the ball valve 130 has been rotated to its fully open position, the annular seal 122 carried by the flow tube should be moved axially back into engagement with the perimeter of the ball 130. This desired sequence of movement is efficiently and economically accomplished in accordance with this invention through the provision of four fluid pressure actuators which are respectively mounted in the wall portion of the upper housing 101 in angularly spaced relationship, preferably at 90° relative to each other, with two diametrically opposed actuators being connected to the ball valve actuating sleeve 140 and the remaining two actuators being connected to the flow tube 120.

Figure 4:
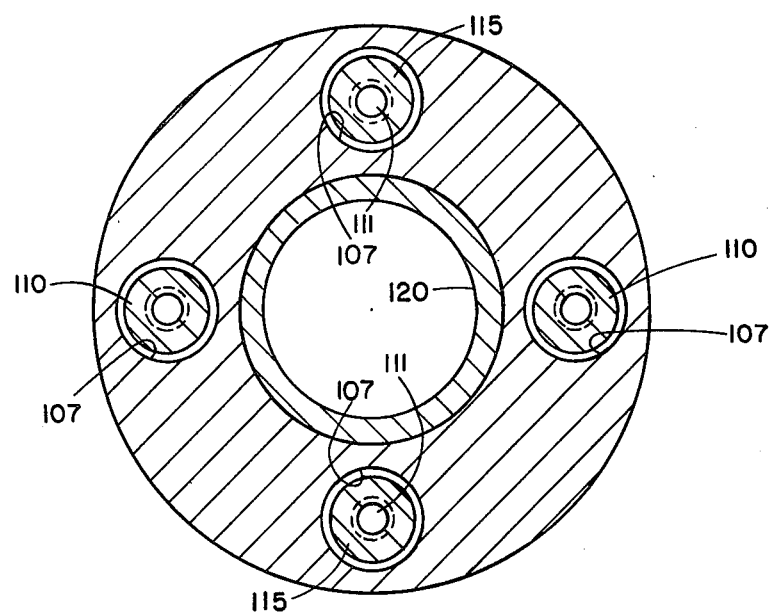
FIG. 4 is a sectional view taken on the plane 4—4 of FIG. 1A.

As best shown in FIG. 4, the upper housing 101 can be provided with four axially extending cylinder bores 107 which are peripherally spaced at 90° intervals and offset from the valve bore. In two diametrically opposed cylinder bores 107, a pair of ball actuating pistons or bellows elements 110 are respectively mounted, and in the remaining two diametrically opposed cylinder bores 107, a pair of flow tube actuating bellows elements 115 are slidably mounted.

According to this invention, the downward ball actuating movement of the ball actuating member 140 is produced by a pair of rods 111 which are respectively connected at their upper ends to the bellows elements 110 by threads 111a. Rods 111 each pass through annular anchoring blocks 113 which are threaded into the lower end of the cylinder bores 107. The bottom ends 111a of rods 111 are of hook shaped configuration and engage an annular recess 140a (FIG. 1B) provided on the ball actuating member 140. A spring 112 surrounds each actuating rod 111 and acts between a shoulder 111b provided on the rods and a spring seat ring 108 which abuts the upper face of the lower outer housing 102.

Figure 2:
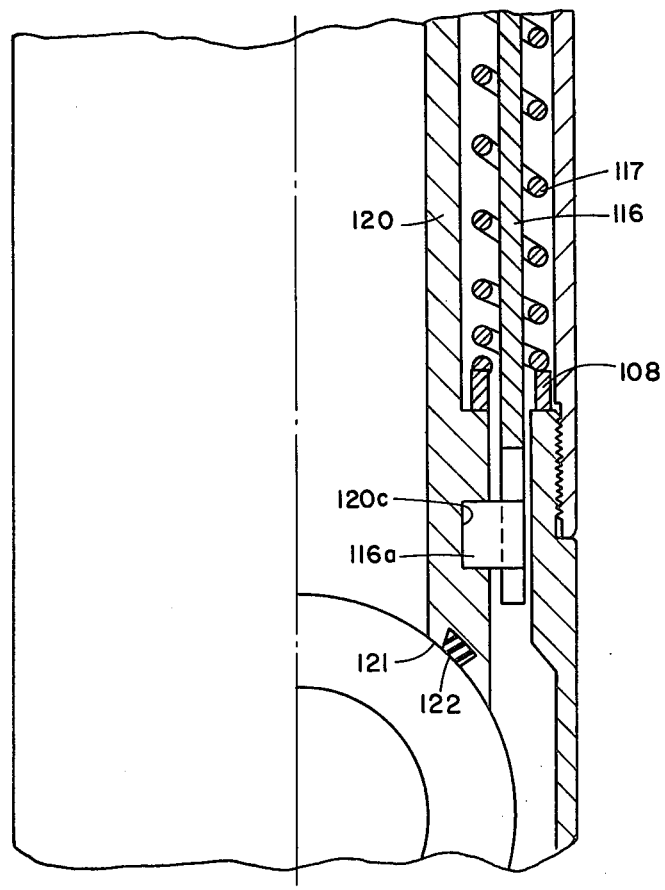
FIG. 2 is a partial view similar to FIG. 1B but with the sectional plane being displaced 90° from that of FIG. 1B.

The required downward movement of the flow tube 120 is produced by a pair of rods 116 (FIG. 2) which are respectively connected at their upper ends the bellows elements 115. The rods 116 are provided with internal lugs 116a at their lower ends which engage a suitable groove 120c provided in the flow tube 120. A spring 117 surrounds the lower end of each of the actuating rods 116 and are compressed between a shoulder (not shown) carried by such rods and a spring seat ring 108 which abuts the upper face of the lower outer housing 102 (FIG. 2).

Control fluid is concurrently supplied to the upper ends of each of the cylinder bores 107 through an axial passage 109 (FIG. 1A) which communicates through a radial port 109a with an annular recess 101c provided on the exterior of the upper tubular housing 101. Recess 101c is disposed beneath the sealing sleeve 103 and fluid leakage along the exterior of the upper housing 101 is prevented by a pair of axially spaced O-rings 103b carried by the sealing sleeve 103 and respectively disposed above and below the annular recess 101c. A radial port 103a in sealing sleeve 103 permits communication with a small conduit (not shown) leading to a source of presured control fluid in conventional manner.

It is therefore apparent that pressured control fluid is concurrently supplied to each of the cylinder bores 107 and hence, concurrently supplied to actuator top sub 110 and 115. To isolate the control fluid pressure from the well fluids, which have free access to the open bottom ends of the axially extending cylinder bores 107, it is preferred to utilize the bellows type seal construction and claimed in co-pending application, Ser. No. 395,544, filed concurrently herewith. Thus, bellows units 150 are respectively provided in surrounding relationship to each of the rods 111 and 116. Bellows units 150 are secured at their upper end by sealable attachment to the actuating top sub 110 or 115, as the case may be, and at their lower ends by sealable attachment to the anchoring rings 113. This effectively eliminates the need for any elastomeric seals within the actuating mechanism for the ball valve unit and further eliminates the need for any precise sealing relationship between either of the actuating top subs 110 or 115 and the respective cylinder bores 107.

From the description thus far, it will be apparent that when control fluid pressure is supplied to the cylinder bores 107, the respective actuating top subs 115 and 116 and bellows units 150 would tend to be axially displaced. For the reasons previously stated, it is desirable to delay the axial movement of the flow tube 120 so that the ball valve 130 is moved axially out of engagement with the elastomeric seal 122 carried by flow tube 120 and rotated to its open position while in such spaced relationship. This desired sequence of movement may be readily accomplished with the apparatus embodying this invention through a number of expedients. The size of the bellows 150 and 115 may be selected so as to inherently delay the response of the bellows units 150, which initiates the downward movement of the flow tube 120, until after the bellows 110 have moved downwardly to effect the axial shifting and rotation of the ball 130. Alternatively, if for manufacturing reasons, it is desired to maintain the cylinder bores 107 and the pistons 110 and 115 the same size, then such differential movement can be obtained through selecting the spring constants of the springs 112 and 117 which respectively oppose the downward movement of rods 111 and 116.

Lastly, it is possible to vary the axial compression resistance of the bellows units 150 to achieve such differential response. Hence, any single one or a combination of these variations may be employed to achieve the desired delayed response of the flow tube 120 to the application of pressured control fluid to the actuating mechanism for the ball valve unit.

Such response differentials will also produce a separation of flow tube 120 from ball valve 130 during the reverse movement of the ball valve 130 to its closed position.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A valve for opening and closing a fluid conduit in a subterranean well comprising: a valve closure member movable between an open and a closed position; an axially shiftable flow tube; a first actuating element axially shiftable in response to control fluid pressure to engage the valve closure member and move said valve closure member from the closed to the open position; a separate second actuating element axially shiftable in response to control fluid pressure to axially move the flow tube into engagement with the valve closure member in the open position; the first actuating element being actuated at a pressure less than the actuating pressure of the second actuating element.

2. The valve of claim 1 wherein said valve closure member is mounted in a valve housing having a flow passage therethrough, said valve closure member establishing communication therethrough when in the open position, said flow tube being axially shiftable within said flow passage.

3. The valve of claim 2 wherein the first and second actuating elements are positioned within the valve housing offset from the flow passage.

4. The valve of claim 3 wherein the first and second actuating elements are positioned within axially extending cylinders within the valve housing, the cylinders being parallel to the flow passage.

5. The valve of claim 4 wherein a spring force resists movement of the first and second actuating elements in response to increased control fluid pressure.

6. The valve of claim 5 wherein the spring force resisting movement of the second actuating element is greater than the spring force resisting movement of the first actuating element.

7. The valve of claim 6 wherein the valve closure member is a ball valve member.

8. A valve for mounting in a fluid conduit in a subterranean well comprising, in combination: a tubular valve housing; a valve closure member for opening and closing the tubular housing bore; actuator means axially shiftably mounted in said housing for axially shifting and positioning said valve closure member in either an open or a closed position relative to the bore of the tubular housing; a flow tube axially shiftably mounted in the tubular housing bore, a first axially extending cylinder chamber in said housing, a first piston slidably mounted in said first cylinder chamber and operatively connected to said actuator means, a second axially extending cylinder chamber in said tubular housing, a second piston slidably mounted in said second cylinder chamber and operatively connected to said flow tube, means for supplying pressured control fluid concurrently to said first and second cylinders to urge said first and second pistons in the same axial direction; first and second resilient means respectively opposing the fluid pressure produced movements of said first and second pistons; said second piston and second resilient means being proportioned to exert a greater opposing force than said first piston and first resilient means, whereby said valve closure member is displaced axially prior to movement of said flow tube.

9. The apparatus of claim 8 wherein said first piston has a smaller effective piston area than said second piston.

10. The apparatus of claim 8 wherein said first and second pistons are substantially equal to effective piston area and said second resilient means exerts a greater opposing force than said first resilient means.

11. A ball valve for mounting in a fluid conduit in a subterranean well comprising, in combination: a tubular valve housing; a ball having a central flow passage; acutator means axially shiftably mounted in said housing for axially shifting and rotating said ball to position said central flow passage in either an open or a closed position relative to the bore of the tubular housing; a flow tube axially shiftably mounted in the tubular housing bore, said flow tube having sealing means on an end face thereof engaging the periphery of said ball; a first axially extending cylinder chamber in said housing, a first piston slidably mounted in said first cylinder chamber and operatively connected to said actuator means, a second axially extending cylinder chamber in said tubular housing, a second piston slidably mounted in said second cylinder chamber and operatively connected to said flow tube, means for supplying pressure control fluid concurrently to said first and second cylinders to urge said first and second pistons in the same axial direction; first and second resilient means respectively opposing the fluid pressure produced movements of said first and second pistons; said second piston and second resilient means being proportioned to exert a greater opposing force than said first piston and first resilient means, whereby said ball is displaced axially relative to said flow tube prior to rotation of said ball.

12. The apparatus of claim 11 wherein said first piston has a smaller effective piston area than said second piston.

13. The apparatus of claim 11 wherein said first and second pistons are substantially equal in effective piston area and said second resilient means exerts a greater opposing force than said first resilient means.

14. A ball valve for mounting in a fluid conduit, comprising, in combination: a tubular housing connectable in the conduit; a ball having a central flow passage; actuator means axially shiftably mounted in said housing for first axially shifting and then rotating said ball to position said central flow passage in either an open or a closed position relative to the bore of the tubular housing; a flow tube axially shiftably mounted in said tubular housing bore; said flow tube having sealing means on an end face thereof engaging the periphery of said ball; a first axially extending cylinder chamber in said housing; a first bellows element slidably mounted in said first cylinder chamber and operatively connected to said actuator means, a second axially extending cylinder chamber in said tubular housing; a second bellows element slidably and sealably mounted in said second cylinder chamber and operatively connected to said flow tube; and means for supplying pressured control fluid concurrently to said first and second cylinder to urge said first and second bellows elements in the same axial direction, the first bellows element actuating the actuator means at a pressure less than the actuating pressure of the second bellows element.

15. The apparatus of claim 14 wherein each said bellows element has one axial end welded to the respective cylinder chamber bore, and a pair of rods respectively disposed within said bellows elements to respectively connect said first bellows element to said actuator means, and said second bellows element to said flow tube.

16. The apparatus of claim 15 further comprising first and second springs respectively opposing fluid pressure produced movements of said first and second bellows elements respectively, said second bellows element and second spring being proportioned to exert a greater opposing force to applied fluid pressure than said first bellows element and first spring, whereby said ball is displaced axially relative to said flow tube prior to rotation of said ball.

17. A ball valve for mounting in a fluid conduit, comprising, in combination: a tubular housing connectable in the conduit; a ball having a central flow passage; actuator means axially shiftably mounted in said housing for first axially shifting and then rotating said ball to position said central flow passage in either an open or a closed position relative to the bore of the tubular housing; a flow tube axially shiftably mounted in said tubular housing bore; said flow tube having sealing means on an end face thereof engaging the periphery of said ball; a first pair of diametrically opposed, axially extending cylinder chambers in said housing, a first pair of pistons respectively slidably mounted in said first cylinder chambers and operatively connected to said actuator means, a second pair of diametrically opposed, axially extending cylinder chambers in said tubular housing, said second pair of cylinder chambers being 90° displaced from said first pair of cylinder chambers, a pair of second pistons respectively slidably mounted in said second cylinder chambers and operatively connected to said flow tube, means for supplying pressured control fluid concurrently to all said first and second cylinders to urge said first and second pistons in the same axial direction; first and second pairs of resilient means respectively opposing pressure produced movements of said first and second pairs of pistons, said second pair of pistons and the respective resilient means being proportioned to exert a greater opposing force than said first pair of pistons and the respective resilient means, whereby said ball is displaced axially to said flow tube prior to rotation of said ball.

18. A ball valve for mounting in a fluid conduit, comprising, in combination: a tubular housing connectable in the conduits; a ball having a central flow passage; actuator means axially shiftably mounted in said housing for first axially shifting and then rotating said ball to position said central flow passage in either an open or a closed position relative to the bore of the tubular housing; a flow tube axially shiftably mounted in said tubular housing bore; said tube having sealing means on an end face thereof engaging the periphery of said ball; a first pair of diametrically opposed, axially extending cylinder chambers in said housing, a first pair of bellows elements respectively slidably mounted in said first cylinder chamber and operatively connective to said actuator means, a second pair of diametrically opposed, axially extending cylinder chambers in said tubular housing, said second pair of cylinder chambers being 90° displaced from said first pair of cylinder chambers, a pair of second bellows elements respectively slidably mounted in said second cylinder chambers and operatively connected to said flow tube, means for supplying pressured control fluid concurrently to all said first and second cylinder chambers to urge said first and second pairs of bellows elements in the same axial direction; a plurality of first and second resilient means respectively opposing the fluid pressure produced movement of said first and second pairs of bellows elements, respectively; said second pair of bellows elements and said second resilient means being proportioned to exert a greater opposing force to the applied fluid pressure than said first pair of bellows elements and said first resilient means, whereby said ball is displaced axially relative to said flow tube prior to rotation of said ball.

* * * * *